US006879432B1

(12) United States Patent
Chen et al.

(10) Patent No.: US 6,879,432 B1
(45) Date of Patent: Apr. 12, 2005

(54) BEAMSPLITTER UTILIZING A PERIODIC DIELECTRIC STRUCTURE

(75) Inventors: Chii-Chang Chen, Taipei (TW); Hung-Ta Chien, Keelung (TW); Pi-Gang Luan, Kaohsiung (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 10/605,400

(22) Filed: Feb. 17, 2004

(51) Int. Cl.[7] .............................. G02F 1/00; G02F 1/03; G02B 6/12; G02B 6/26; H01L 31/00
(52) U.S. Cl. ...................... 359/321; 359/322; 359/245; 359/237; 385/14; 385/15; 385/131; 250/214.1; 372/64; 343/909
(58) Field of Search ................................. 359/321, 322, 359/237, 245, 298; 250/214.1; 385/14, 15, 28, 129, 130, 131; 343/909, 754; 372/19, 21, 64

(56) References Cited

U.S. PATENT DOCUMENTS

| 5,389,943 | A | * | 2/1995 | Brommer et al. ........... 343/909 |
| 5,999,308 | A | * | 12/1999 | Nelson et al. .............. 359/321 |
| 6,064,506 | A | * | 5/2000 | Koops ........................ 359/237 |
| 6,278,105 | B1 | * | 8/2001 | Mattia ..................... 250/214.1 |
| 6,466,709 | B1 | * | 10/2002 | Scherer et al. ................ 385/15 |

* cited by examiner

*Primary Examiner*—Loha Ben
(74) *Attorney, Agent, or Firm*—Jiang Chyun IP Office

(57) ABSTRACT

An optical device having a photonic crystal structure is provided. The photonic crystal structure includes a plurality of rods/holes, a plurality of light input ports, a plurality of light output ports, a light path; and a defect of rod/hole located in the light path. The photonic crystal structure of the optical device can be optimized to adjust the powers of the lights of the output ports, and thus the output powers having identical intensities can also be achieved. When a plurality of lights is launched via the input ports, the powers and the phases of the lights of the output ports can also be optimized.

6 Claims, 7 Drawing Sheets

BEAMSPLITTER UTILIZING A PERIODIC DIELECTRIC STRUCTURE

BACKGROUND OF INVENTION

1. Field of the Invention

The invention relates in general to an optical device, and more particularly, to an optical device utilizing a periodic dielectric structure.

2. Related Art of the Invention

In recent years, photonic crystals have attracted many research workers by its excellent manipulation for photons. A variety of effects on photons by photonic crystals is caused by the structures and materials of the photonic crystals. Photonic crystals are periodic optical materials, e.g., periodic dielectric materials. The characteristic defining a photonic crystal structure is the periodic arrangement of dielectric or metallic elements along one or more axes. Thus, photonic crystals can be one-, two-, and three-dimensional. Most commonly, photonic crystals are formed from a periodic lattice of dielectric material. When the dielectric constants of the materials forming the lattice are different (and the materials absorb minimal light), the effects of scattering and Bragg diffraction at the lattice interfaces control the propagation of optical signals through the structure. These photonic crystals can be designed to prohibit optical signals of certain frequencies from propagating in certain directions within the crystal structure. The range of frequencies for which propagation is prohibited is known as the photonic bandgap.

In general, photonic crystals are provided for controlling the propagation and the intensity on the propagation direction of the light. A variety of devices constructed by photonic crystals had been studied such as waveguides, filters, multiplexers and optical fibers etc. Low loss, small size, and ingenuity are the main advantages of photonic crystals.

An important purpose of photonic crystal is beamsplitter. To divide the input power identically, many kinds of beamsplitters have been proposed, such as T-type, Y-type and cross-type photonic crystal beamsplitters. Referring to FIGS. 1B to 1D, schematic drawings of conventional T-type, Y-type and cross-type photonic crystal beamsplitters are illustrated respectively. Nevertheless, the conventional beamsplitters are either one input and two outputs or one input and three outputs, and a photonic crystal with at least two inputs and at least two outputs, e.g., a beamsplitter used in a Mach-Zehnder interferometer has become more and more important. Referring to FIG. 1A, a beamsplitter 100 used in a Mach-Zehnder interferometer is shown, in which the light may be input from the ports 102, 104, and output lights can be obtained simultaneously at the ports 106 and 108. Moreover, the light also can be input from the port 102 and 104 simultaneously, and output lights can be obtained simultaneously at the ports 106 and 108. Therefore, a photonic crystal beamsplitter with at least two inputs and at least two outputs is provided in this invention.

SUMMARY OF INVENTION

Accordingly, the present invention provides an optical device having photonic crystal structure with at least two inputs and at least two outputs, in which output lights can be obtained and adjusted simultaneously at the output ports by optimizing the photonic crystal structure. Moreover, the output powers having identical intensities can also be achieved.

In order to achieve the above objects and other advantages of the present invention, an optical device is provided. The optical device constructed by photonic crystal may comprise, for example, a plurality of rods, at least two light input ports, at least two light output ports, a light path and a defect of rod located in the light path. According to a preferred embodiment of the invention, the optical device may be provided as a beamsplitter in which each one of the input light is split into at least two output lights with identical powers.

In an embodiment of the invention, the powers of the output lights can be optimized by adjusting the photonic crystal structure. Preferably, the powers of the output lights of the output ports can be identical or different.

Preferably, the optical device includes two input ports, and more particularly, the two input ports are orthogonal. Preferably, the optical device includes two output ports, and more particularly, the two output ports are orthogonal.

In another embodiment of the invention, an optical device is provided. The optical device constructed by photonic crystal may comprise, for example, a plurality of holes, at least two light input ports, at least two light output ports, a light path and a detect of hole located in the light path. The optical device may also be provided as a beamsplitter in which each one of the input light is spilt into at least two output lights with identical powers.

In an embodiment of the invention, the powers of the output lights can be optimized by adjusting the photonic crystal structure. Preferably, the powers of the output lights of the output ports can be identical or different.

Preferably, the optical device includes two input ports, and more particularly, the two input ports are orthogonal. Preferably, the optical device includes two output ports, and more particularly, the two output ports are orthogonal.

Accordingly, in the preferred embodiment of the invention, when a defect is introduced to a photonic crystal, the optimized structure can be obtained to adjust the phase and the power of the output lights. A variety of optical devices having a plurality of input ports and output ports described above also can be realized by optimizing the structures of the photonic crystal structures in the optical devices.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Moreover, each embodiment described and illustrated herein includes its complementary conductivity type embodiment as well.

Figure 1A:
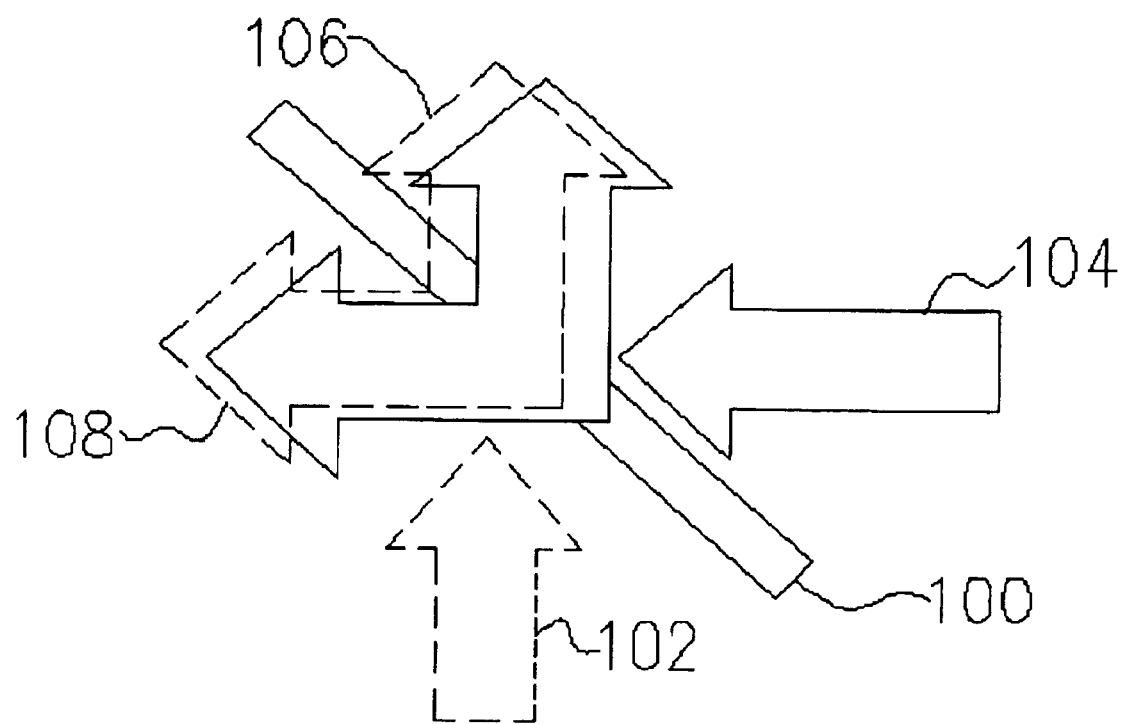
FIG. 1A is a sketch illustrating a beamsplitter used in a Mach-Zehnder interferometer.
Figure 1B:
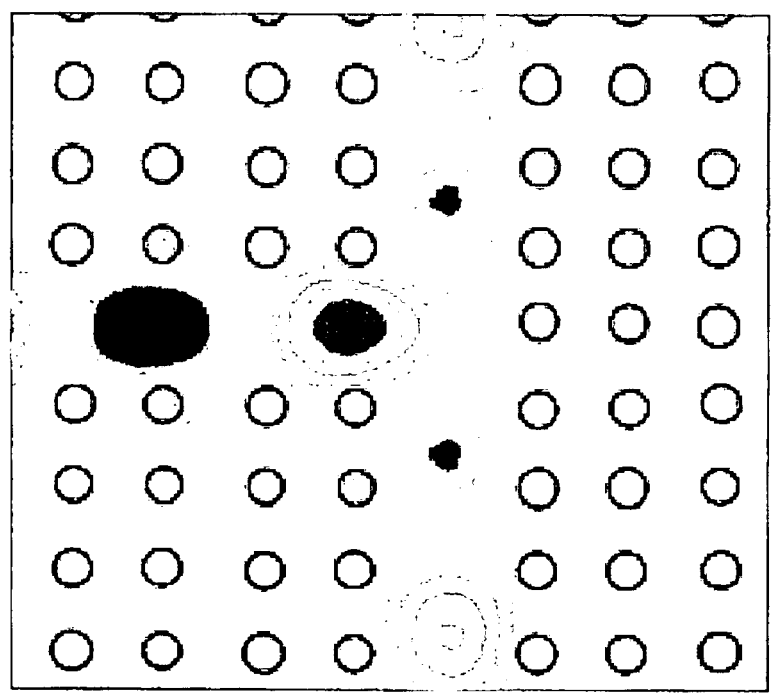
FIGS. 1B to 1D illustrate schematic drawings of conventional T-type, Y-type and cross-type photonic crystal beamsplitters respectively.
Figure 1C:
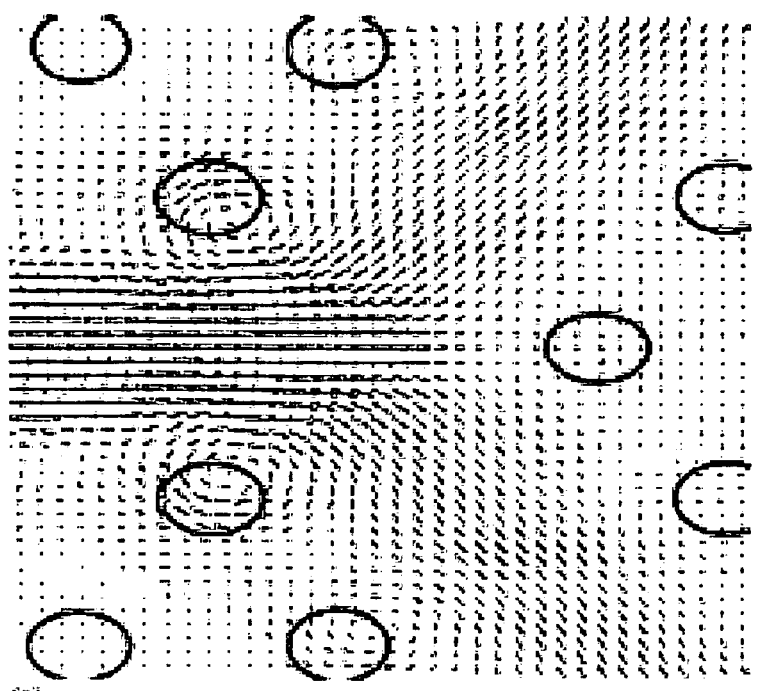
Figure 1D:
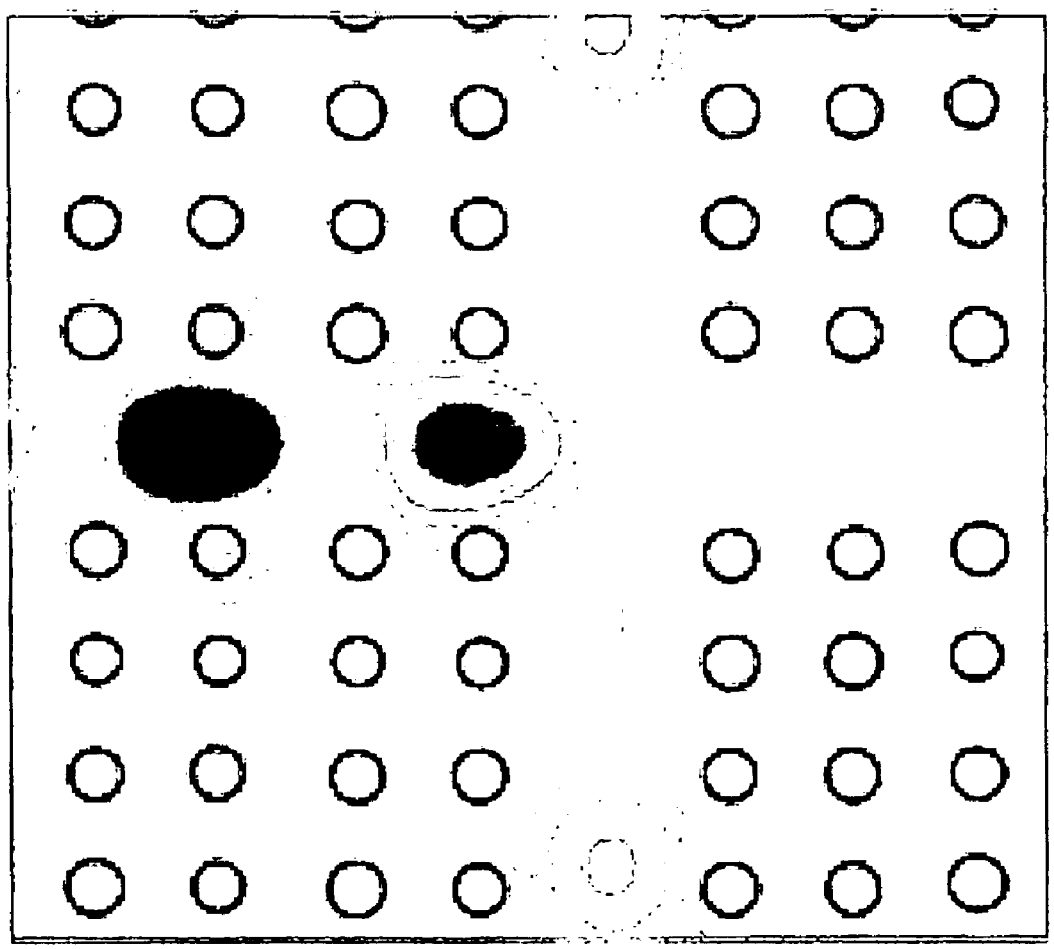
Figure 2:
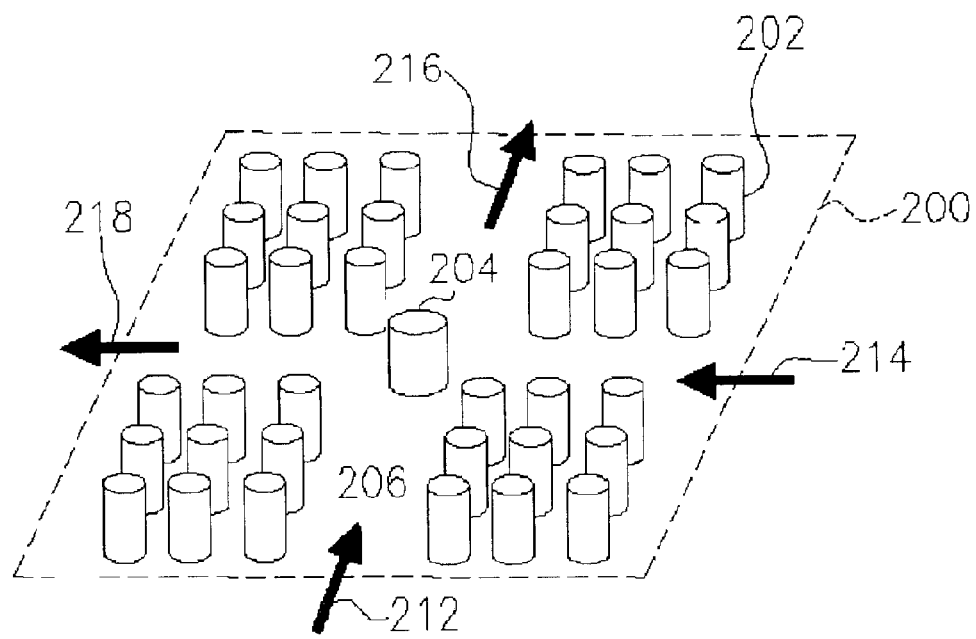
FIG. 2 is a perspective view illustrating photonic crystals having a plurality of rods according to a preferred embodiment of the invention.
Figure 3:
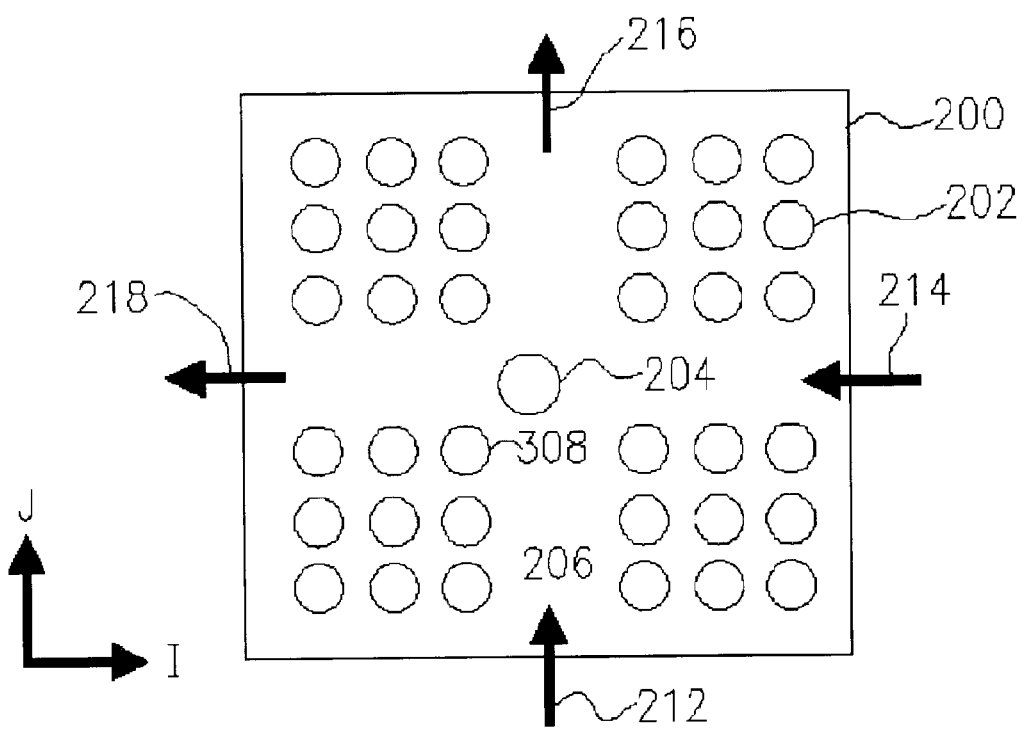
FIG. 3 is a top view of FIG. 2 according to a preferred embodiment of the invention.

FIG. 2 is a perspective view illustrating photonic crystals having a plurality of rods according to a preferred embodiment of the invention. Referring to FIG. 2, a photonic crystal 200 comprising a plurality of rods 202, a defect of rod 204, a light path 206, two input ports 212, 214 and two output ports 216, 218. FIG. 3 is a top view of FIG. 2 according to a preferred embodiment of the invention, and like elements in FIG. 3 refers to like numbers in FIG. 2.

Figure 4:
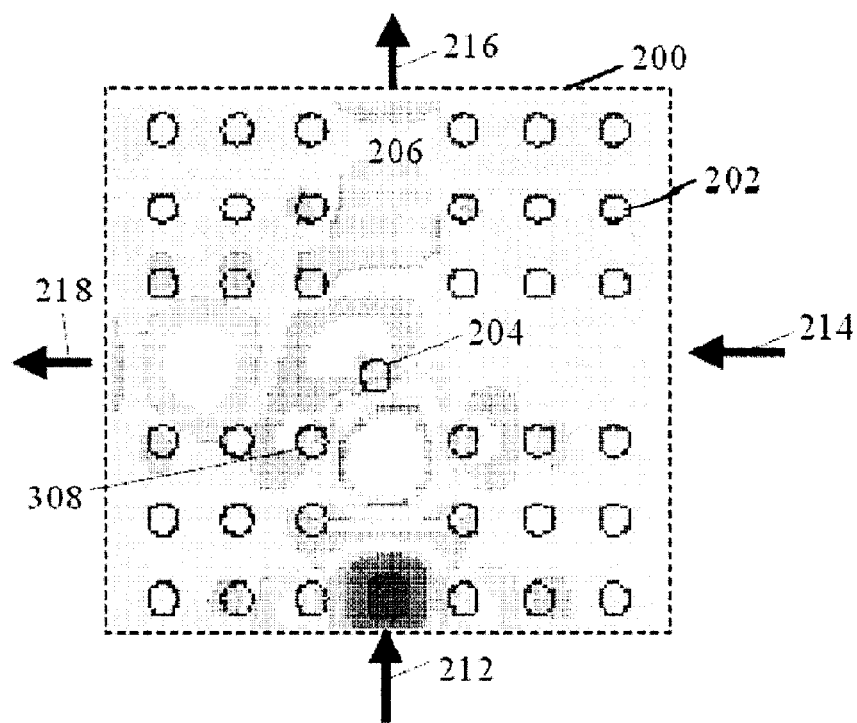
FIG. 4 is a simulation diagram of the propagation of light in the photonic crystal shown in FIG. 3 according to a preferred embodiment of the invention.
Figure 5:
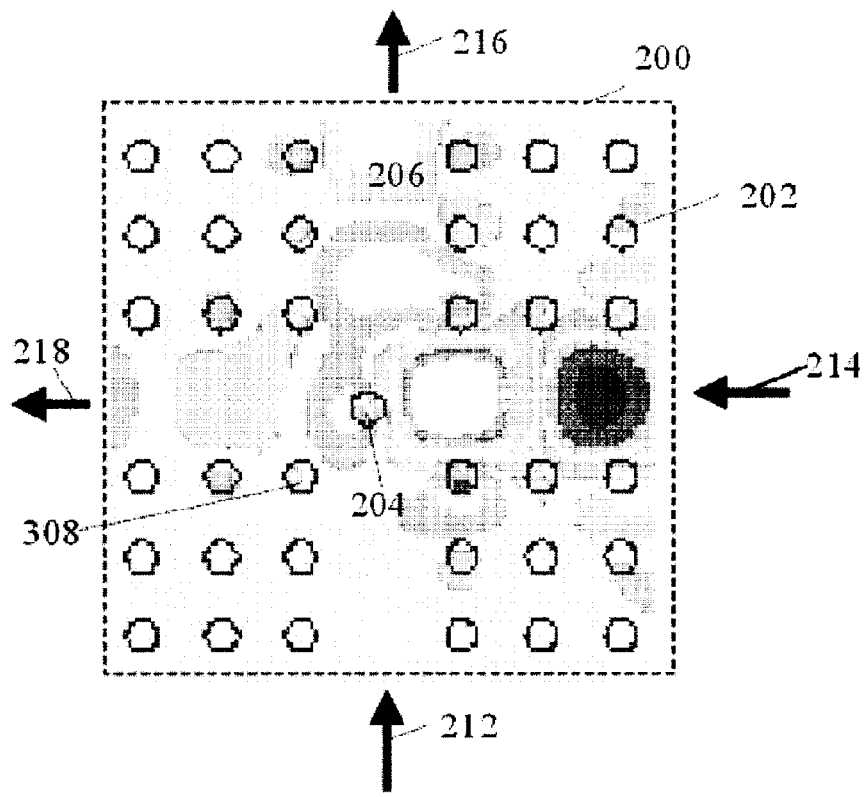
FIG. 5 is a simulation diagram of the propagation of light in the photonic crystal shown in FIG. 3 according to a preferred embodiment of the invention.

A finite-difference time-domain ("FDTD") method is used to calculate the propagation of the lights in an optical device as shown in FIG. 2 and FIG. 3. The lattice constant, i.e., the center-to-center distance of the nearest rods 202 is L, and the radius of the rods 202 is 0.2 L. The electric field polarization of the light is chosen parallel to the rods 202, and the wavelength of the input light is chosen in the forbidden bandgap of the photonic crystal structure 200 to be 2.5 L, and the predetermined wavelength also ensures single mode operation in the light propagation procedure. The reflective index of the rod 202 is 3, and that of the air is 1. The initial condition of the radius R and the position of the defect is set at 0.2 L and a position having a vector 0.83LI=0.83LJ from the center of the rod 308, in which the vectors I and J are the unit vectors shown in FIG. 3. Thus the angle of the vector with the unit vector I is 45° and the distance D between the centers of the rod 308 and the defect 204 is 1.18L. FIG. 4 and FIG. 5 are simulation diagrams of the propagation of lights in the photonic crystal shown in FIG. 3 using the conditions described above and the FDTD method. Referring to FIG. 4, as the input light is launched in the input port 212, the light can be observed in the output ports 216 and 218. In FIG. 5, as the input light is launched in the input port 214, the light can also be observed in the output ports 216 and 218. In the proceeding optimization procedure, the angle of the vector with the unit vector I is act at 45°, the radius R and the distance D are optimized in order to equalize the power of the lights of the output ports 216 mad 213.

Figure 6:
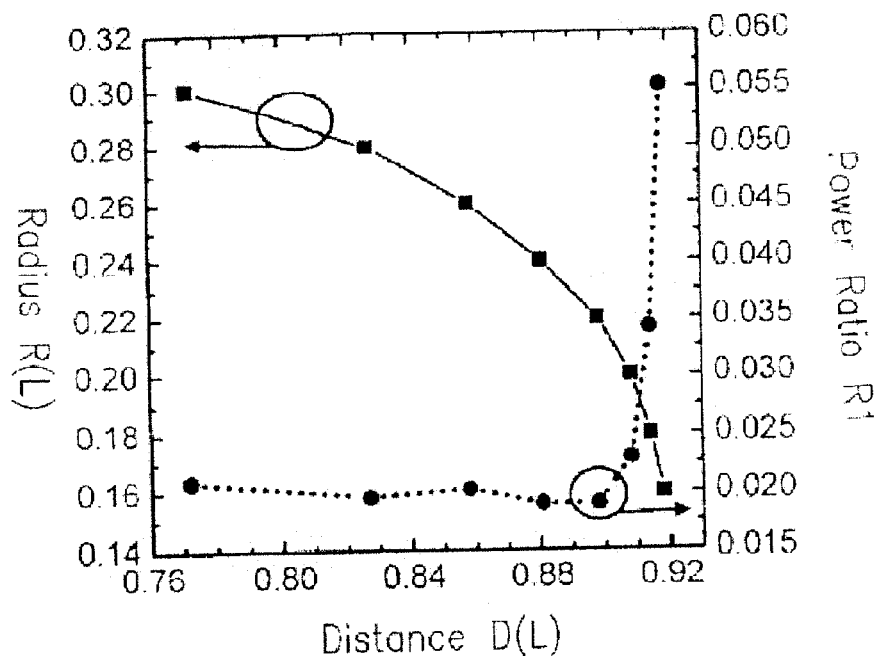
FIG. 6 is an optimization result of the power of lights outputted from the photonic crystal shown in FIG. 3 and FIG. 4 according to a preferred embodiment of the invention.

FIG. 6 is an optimization result of the power of lights outputted from the photonic crystal structure shown in FIG. 3 and FIG. 4. In FIG. 6, the light is inputted from the input port 212, and the output power detected in the port 214, 216 and 218 are P214, P216 and P218 respectively. The solid line in FIG. 6 shows the corresponding radius R of the defect 204 for each distance D as the powers P216 and P218 of the two output ports 216 and 218 are identical. The result indicates that the corresponding radius of the defect 204 decrease with the increase of the distance D to equalize the power of the two output ports 216 and 218. The dotted line in FIG. 6 shows the ratio R1 of the power P214 to the sum of the output powers of P214, P216 and P218 for each distance D, i.e., P214/(P214+P216+P218). The minimum power P214 can be obtained as the distance D is around 0.83 L and 0.90 L where the power ratio is about 2%. Accordingly, the power ratio R1 can be maintained at about 2% in a wide range of the radius R and the distance D.

Figure 7:
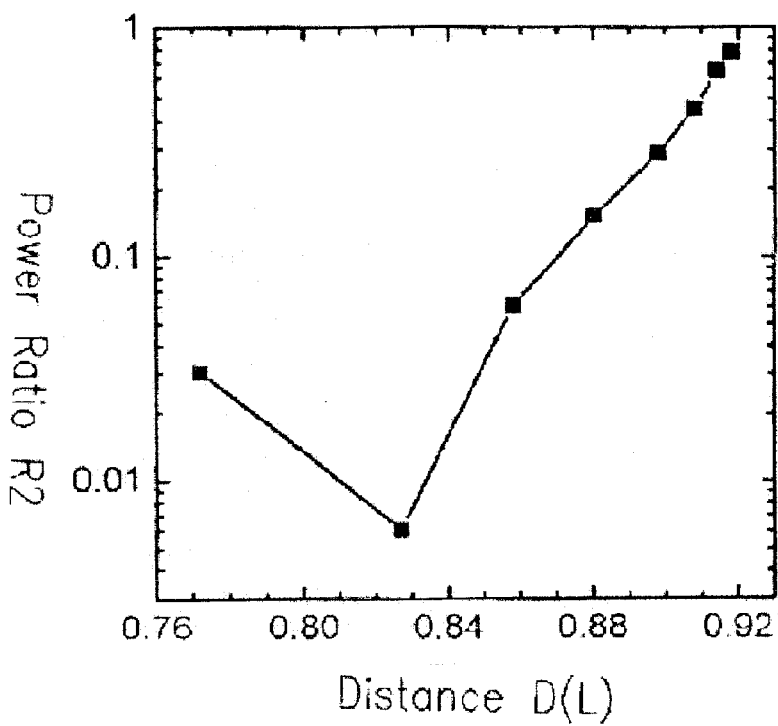
FIG. 7 is an optimization result of the power of lights outputted from the photonic crystal shown in FIG. 3 and FIG. 5 according to a preferred embodiment of the invention.

FIG. 7 is an optimization result of the power of lights outputted from the photonic crystal structure shown in FIG. 3 and FIG. 5. The optimized radii R for each distance D obtained in FIG. 6 are used to simulate the condition in FIG. 5. FIG. 7 shows the power ratio R2 of the power difference to the power summation of the two output ports 216 and 218 of FIG. 5, i.e., (P216−P218)/(P216+P218). The result in FIG. 7 indicates that as the powers P216 and P218 in FIG. 4 are equalized, using the same parameters R and D in FIG. 5, the power P216 and P218 may not be identical. The power ratio R2 is minimized to be around 0.6% as the radius R and the distance D are 0.83 L and 0.28 L respectively.

Figure 8:
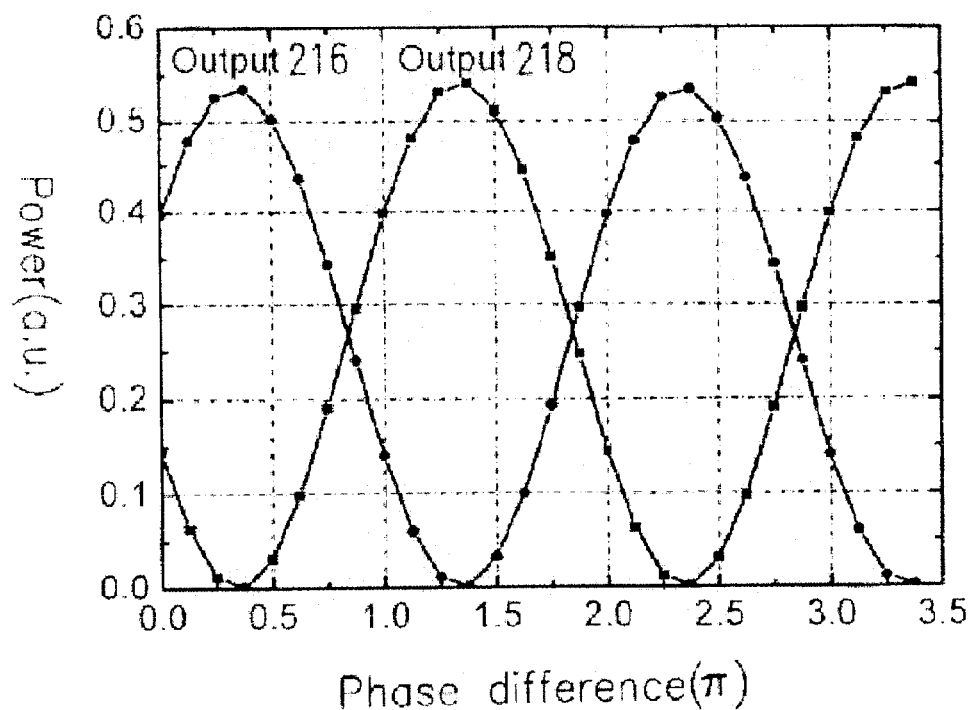
FIG. 8 is an optimization result of the power of lights outputted from the photonic crystal shown in FIG. 3 according to a preferred embodiment of the invention.

With the optimize condition obtained above, two lights are inputted from the input ports 212 and 214 in FIG. 2. By varying the phase difference between the two input ports 212 and 214, the powers in the two output ports 216 and 218 are changed. FIG. 8 shows the powers outputted from the two output ports 216 and 218, in which a sinusoidal relation between the output powers P216 and P218 and the phase difference indicating the interference effect can be obtained in the photonic crystal structure 200.

Figure 9:
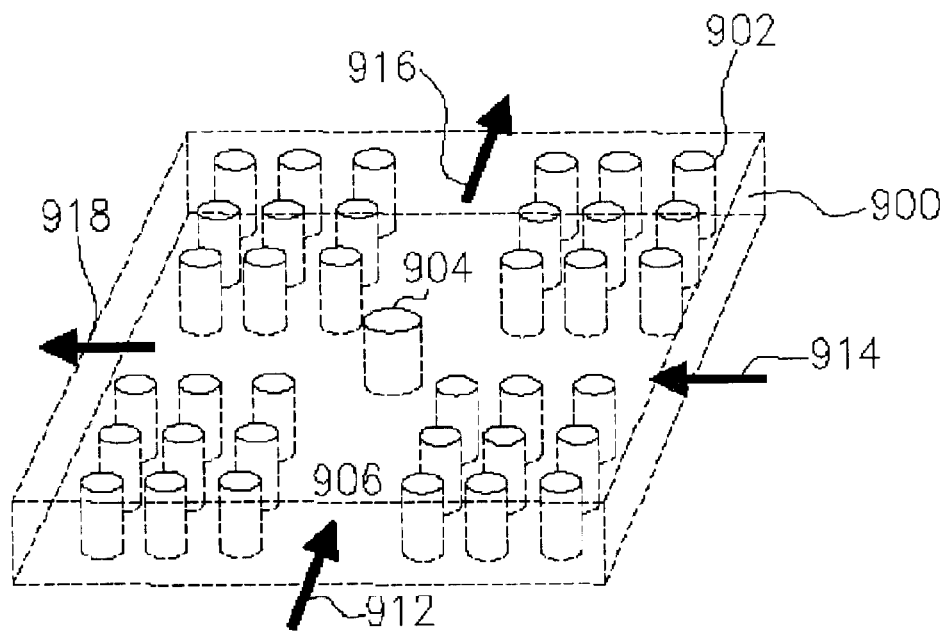
FIG. 9 is a perspective view illustrating photonic crystals having a plurality of holes according to a preferred embodiment of the invention.

According to another embodiment of the invention, an optical device having a photonic crystal structure as shown in FIG. 9 has also been optimized. FIG. 9 is a perspective view illustrating photonic crystals having a plurality of holes according to a preferred embodiment of the invention. The photonic crystal structure of FIG. 9 is similar to that of the FIG. 2, but only the rods in FIG. 2 are replaced by holes in FIG. 9. Thus the top view of FIG. 9 is similar to that of FIG. 2, as shown in FIG. 3. Accordingly, a similar result as described above can also be obtained, and will not be described in detail hereinafter.

Accordingly, in the preferred embodiment of the invention, when a defect is introduced to a photonic crystal, the optimized structure can be obtained to adjust the phase and the power of the output lights. A variety of optical device having a plurality of input ports and output ports described above also can be realized by optimizing the structure of the photonic crystal structures in the optical device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical device, comprising:
    a plurality of rods, wherein the rods are arranged by a photonic crystal structure;
    a plurality of light input ports;
    a plurality of light output ports;
    wherein at least one of the light input ports is adopted for inputting a light, and at least one of the light output ports is adopted for outputting the light, wherein a path of the light in the rods forms a light path; and
    a defect of rod located in the light path.

2. The optical device of claim 1, wherein a plurality of output lights of the light that are outputted from the light output ports have the same intensities.

3. An optical device, comprising:
    a plurality of holes, wherein the holes are arranged by a photonic crystal structure;
    a plurality of light input ports;
    a plurality of light output ports;
    wherein at least one of the light input ports is adopted for inputting a light, and at least one of the light output ports is adopted for outputting the light, wherein a path of the light in the rods forms a light path; and
    a defect of hole located in the light path.

4. The optical device of claim 3, wherein a plurality of output lights of the light that are outputted from the light output ports have the same intensities.

5. An optical device, comprising:
    a plurality of rods, wherein the rods are arranged by a photonic crystal structure;
    a plurality of light input ports;
    a plurality of light output ports;
    wherein at least one of the light input ports is adopted for inputting a light, and at least one of the light output ports is adopted for outputting the light, wherein a path of the light in the rods forms a light path; and
    a defect of rod located in the light path;
    wherein a plurality of output lights of the light that outputted from the light output ports have the same intensities.

6. An optical device, comprising:
    a plurality of holes, wherein the holes are arranged by a photonic crystal structure;
    a plurality of light input ports;
    a plurality of light output ports;
    wherein at least one of the light input ports is adopted for inputting a light, and at least one of the light output ports is adopted for outputting the light, wherein a path of the light in the rods forms a light path; and
    a defect of hole located in the light path;
    wherein a plurality of output lights of the light that outputted from the light output ports have the same intensities.

* * * * *